United States Patent [19]

Egger et al.

[11] 4,158,078
[45] Jun. 12, 1979

[54] HEAT STRIP OR PANEL

[75] Inventors: Lambert Egger; Hubert Bildstein, both of Reutte, Austria

[73] Assignee: Huebner Bros. of Canada Ltd., Winnipeg, Canada

[21] Appl. No.: 869,058

[22] Filed: Jan. 13, 1978

[30] Foreign Application Priority Data

Jun. 10, 1977 [GB] United Kingdom ............... 24451/77

[51] Int. Cl.² .................. B32B 3/06; B32B 17/10; B32B 9/00
[52] U.S. Cl. ................................ 428/103; 428/480; 428/408; 428/422; 428/102; 428/913
[58] Field of Search ............ 428/102, 103, 408, 422, 428/430, 480, 913, 68, 74, 76; 427/336, 372; 174/98, 118, 120 SR, 122 G, 126 CP

[56] References Cited
U.S. PATENT DOCUMENTS

| 3,855,051 | 12/1974 | Lania et al. ............... 174/120 SR |
| 3,863,758 | 2/1975 | Connelly ............... 428/74 X |
| 3,865,626 | 2/1975 | Diener et al. ............... 428/480 X |
| 3,867,245 | 2/1975 | Herman ............... 428/480 X |
| 3,968,297 | 7/1976 | Saver ............... 428/422 X |
| 3,993,827 | 11/1976 | Dukert et al. ............... 428/408 X |
| 4,046,938 | 9/1977 | Torossian et al. ............... 428/430 X |

*Primary Examiner*—George F. Lesmes
*Assistant Examiner*—Daniel R. Zirker
*Attorney, Agent, or Firm*—Stanley G. Ade

[57] ABSTRACT

A film of electroconductive particles is impregnated into a glass fiber mat and sandwiched between insulating protecting layers and connectable to source of electrical power so that the entire panel develops heat which is then radiated through the protective panels. Conductive strips are sewn or otherwise secured to the edges of the glass fiber mat and the protecting layers can either be flexible plastic material or alternatively can be rigid panels such as plywood, plasterboard or the like.

12 Claims, 4 Drawing Figures

HEAT STRIP OR PANEL

BACKGROUND OF THE INVENTION

This invention relates to new and useful improvements in heat strips or panels which comprise a film of electroconductive particles sandwiched between protecting layers and connectable to a source of electrical power so that the entire panel developes heat which is then radiated through the protective panels.

An example of such material is illustrated and described in U.S. Pat. No.: 3,865,626 dated Feb. 11, 1975 and this patent is hereby made of record in this application.

This patent teaches the use of a high strength polyester film of low surface resistance which is produced by treating one or both surfaces of a stretched polyester film of high mechanical strength with a solvent or swelling agent capable of swelling or superficially dissolving the polyester film surface, applying electroconductive particles, preferably carbon black, to the surface in a concentration corresponding to the desired surface resistance, and then subjecting the film to a heat treatment. In the case of pigments which are inert to the solvents or swelling agents employed, such as carbon black, the procedure is advantageously such that the electroconductive particles are dispersed in the solvents or swelling agents used for superfically dissolving or swelling the surface of the polyester film, the concentration of the dispersion, relative to the proportion of pigment, ranging from 0.1 to 12.0% by weight, preferably from 0.5 to 5.0%. The quantity of carbon black to be employed per square meter of film surface ranges from 0.1 g/m$^2$, preferably from 0.3 g/m$^2$ to 3.0 g/m$^2$. The dispersion is applied to the film surface and the film is then subjected to a heat treatment.

SUMMARY OF THE INVENTION

The present invention shows considerable improvement over the prior art inasmuch as the electroconductive particles are carried by a flexible glass fiber core with conductive strips such as copper tapes, being sewn to each edge of the core. Both the core and the conductive strips are then sandwiched between protective layers such as polyester layers or plywood layers or the like.

A stronger film is produced and the heat generation characteristics are more readily controlled by this invention.

One aspect of the invention is to provide a heat strip or panel comprising a central flexible core impregnated with electroconductive particles, flexible electrical contact strips sewn upon said core in substantially parallel alignment to one another, a cover panel of electrical insulating material laminated one upon each side of said core to enclose said core and said electrical contact strips, and electrical conductors operatively secured to said electrical contact strips and extending beyond the boundaries of said heat strip.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
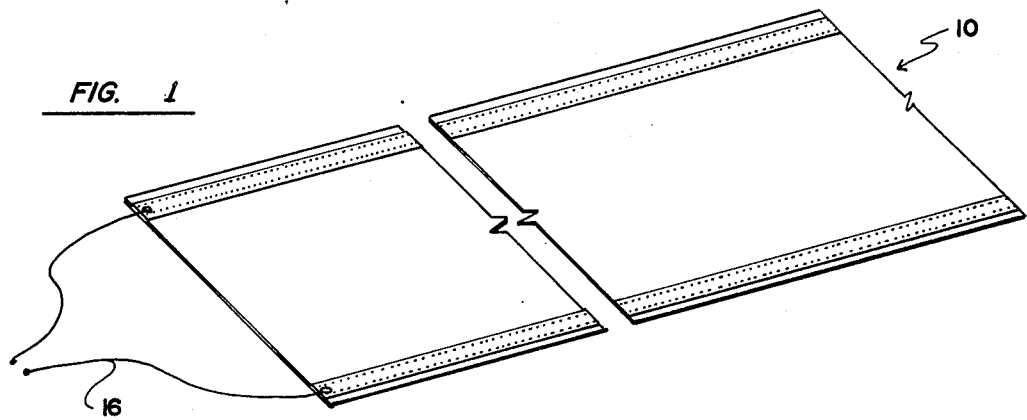
FIG. 1 is an isometric view of one embodiment of the finished product.
Figure 2:
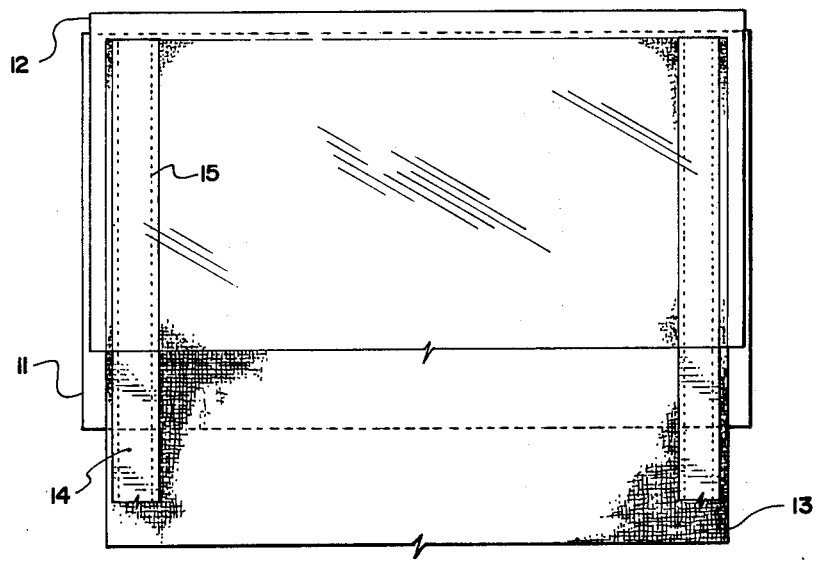
FIG. 2 is a fragmentary partially broken away view of the heat strip or panel shown in FIG. 1.
Figure 3:
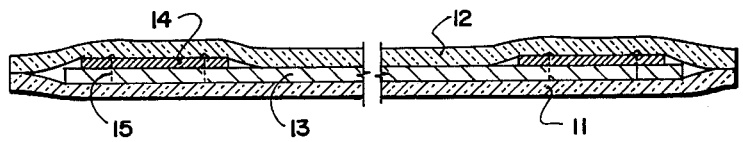
FIG. 3 is an enlarged cross sectional view of the heat strip or film shown in FIG. 1.

Proceeding therefore to describe the invention in detail, reference character 10 shows the preferred embodiment in the form of a heat strip although of course the width and length can be varied at will.

This embodiment consists of a flexible electrically insulating base panel of polyester or Teflon material or the like identified by reference character 11 and an upper flexible electrically insulating panel 12 of similar material with a flexible glass fiber strip, matrix or core 13 laminated therebetween.

This glass fiber strip or core which may be woven or in mat form is coated and/or impregnated with electroconductive particles (not illustrated) but as described in U.S. Pat. No. 3,865,626 and flexible conductive tapes such as copper strips 14 are sewn to the core 13 adjacent the longitudinal edges thereof, by means of stitching 15.

The protective laminates 11 and 12 completely enclose the core 13 and the copper strips 15 and means are provided to connect flexible conductors 16 to each of one end of the strips 15 thus enabling the device to be connected to a source of electrical power (not illustrated) by means of a conventional plug or the like (not illustrated).

Figure 4:
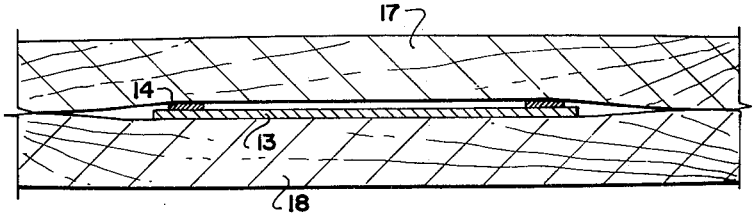
FIG. 4 is an enlarged fragmentary view of an embodiment of the invention utilizing substantially rigid panels as the protective layers.

FIG. 4 shows an alternative embodiment in which the protective panels 11 and 12 take the form of plywood sheets or the like 17 and 18 once again with the core 13 and the conductive tapes 14 being sandwiched therebetween. These panels can either be secured together by means of adhesive or, alternatively, by staples (not illustrated).

The glass fiber core is of course flexible and is dipped or passed through a trough carrying electroconductive particles in solution with a liquid which will evaporate and the core is then passed between preset rollers to gauge the thickness of the electroconductive particles adhering to the core thus controlling the resistance of the finished sheet to the desired design parameters.

Once it has been dried, the foil or conductive tapes 14 are sewn along each edge whereupon the finished core may be laminated between the protective sheets 11 and 12 or 17 and 18 or any other convenient material.

When connected to a source of electrical power, heat is generated within the core which radiates through the protective sheets in a manner similar to that well known in the art.

Many electroconductive particle mixtures can be utilized and as an example, the following may be used:
45 parts of graphite (83% to 90%)
25 parts of silicone
9 parts of Casein
20 parts of Probiofan L5, an emulsifier of the German Hoechst Chemical Co.
0.02 to 0.05 of a defoaming agent The material used for the outer panels or laminates will of course depend upon several factors one of which is the heat range generated by the core or central mat. As an example, if the heat generated is up to 230° F. then a 4 m/m polyester laminate may be used. Between 230° F. and 375° F., a 5 m/m Teflon material (polytetrafluoroethylene) should be used and if the heat generated exceeds 375° F. then a material known as Kapton Dupont type H300 or F300 should be used. This is a polymide polymer film.

The various constructions can be utilized under a variety of conditions and for a considerable variety of uses.

Given below is a partial list of the uses to which the various constructions can be placed, in order to supply controlled heat to the item with which it is used, but it is to be understood that this list is not meant to be limiting.

RAILWAYS

Marshalling yard oil stands
Switches
Oil storage tanks
Oil transportation tank cars
Tar storage tanks
Sulphur transportation tank cars
Chemical transportation tank cars
Aircraft—snowmobiles and tractor heating
Wood chip transportation Gondola cars
Coal transporation Gondola cars
Gravel transporation Gondola cars
Ore transporation Gondola cars
Heated cars for provisions, fruit, canned goods and vegetable transportation.
Plenums

COMMERCIAL

Buses
Perishable food transport trucks
Oil tank trucks
Warehouse heating
Office heating
Automobile and truck heating
Market gardener greenhouses and cold frames
Piggy barns
Dairy barns
Poultry barns
Beehives
Mining—underground tunnels, eating rooms, waterlines (all types)
Surface - water-lines
Trenching and excavations
Heating for shops, garages, stores, stadiums and arenas
Northern installations (N.O.R.A.D.)
Grain elevators
Grain dryers
Airport runways
Use in cooking equipment
Ovens
Grills
Fryers
Dishwasher heaters
Plate and food warmers
Steam cooking equipment
Coffee making equipment
Food processing of all types
All industries requiring heating and/or drying processing.
Water heating
Auto batteries
Engines
Seats

DOMESTIC

Blankets for all types of heat
Home heating
Mobile trailer homes
Travel trailers
Campers
Heat fixtures
Baseboard heat
Hair dryers
Motel and hotel rooms
Ceiling heat
Wallboard heat
Under floor heating
Wall picture heaters
Solarium heating
Crib heating for premature babies
Stadium heating
All types of space heating including furnaces and boilers.

MEDICAL

Bed warmers
Body warmers
Therapeutic equipment in which radiant or so called "deep" heat can be generated.

Although the flexible and rigid embodiments have been mentioned as being used for different purposes as specified above, nevertheless it will be appreciated that the constructions described can be interchanged so far as usage is concerned, depending upon design parameters.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. A heat strip or panel comprising a central flexible glass fibre core impregnated with electroconductive particles, flexible electrical contact strips sewn upon said core in substantially parallel alignment to one another, a cover panel of electrical insulating material laminated one upon each side of said core to enclose said core and said electrical contact strips, and electrical conductors operatively secured to said electrical contact strips and extending beyond the boundaries of said heat strip.

2. The heat strip according to claim 1 in which said electrical contact strips comprise copper tapes sewn to said core.

3. The heat strip according to claim 1 in which said electrical insulating material is flexible.

4. The heat strip according to claim 2 in which said electrical insulating material is flexible.

5. The heat strip according to claim 1 in which said electrical insulating material is formed from substantially rigid panels of plywood.

6. The heat strip according to claim 2 in which said electrical insulating material is formed from substantially rigid panels of plywood.

7. The heat strip according to claim 1 in which said central core is formed from flexible woven glass fiber material.

8. The heat strip according to claim 2 in which said central core is formed from flexible woven glass fiber material.

9. The heat strip according to claim 3 in which said central core is formed from flexible woven glass fiber material.

10. The heat strip according to claim 4 in which said central core is formed from flexible woven glass fiber material.

11. The heat strip according to claim 5 in which said central core is formed from flexible woven glass fiber material.

12. The heat strip according to claim 6 in which said central core is formed from flexible woven glass fiber material.

* * * * *